US007194792B2

(12) United States Patent
Grace et al.

(10) Patent No.: US 7,194,792 B2
(45) Date of Patent: Mar. 27, 2007

(54) METHOD OF ASSEMBLING A REFRIGERATOR CABINET

(75) Inventors: James M. Grace, Elberon, IA (US); Dean A. Martin, Solon, IA (US); Eugene H. Schuchert, Iowa City, IA (US); Forrest F. Wing, Des Moines, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 11/353,943

(22) Filed: Feb. 15, 2006

(65) Prior Publication Data

US 2006/0125361 A1 Jun. 15, 2006

Related U.S. Application Data

(62) Division of application No. 10/617,401, filed on Jul. 11, 2003, now Pat. No. 7,014,283.

(60) Provisional application No. 60/396,023, filed on Jul. 16, 2002.

(51) Int. Cl.
*B23P 11/00* (2006.01)
*A47B 96/00* (2006.01)

(52) U.S. Cl. .......................... 29/434; 29/428; 312/406

(58) Field of Classification Search .................. 29/434, 29/428, 437, 438, 439, 525.01, 525.02, 436; 312/406, 407, 400, 406.2
See application file for complete search history.

(56) References Cited

U.S. PATENT DOCUMENTS

| | | | |
|---|---|---|---|
| 2,300,405 | A | 11/1942 | Cook |
| 3,174,642 | A | 3/1965 | Loewenthal et al. |
| 3,915,527 | A | 10/1975 | Besing |
| 4,170,391 | A | 10/1979 | Bottger |
| 4,586,348 | A | 5/1986 | Nakayama et al. |
| 4,632,470 | A | 12/1986 | Jenkins et al. |
| 4,735,062 | A | 4/1988 | Woolley et al. |
| 4,822,117 | A | 4/1989 | Boston, Jr. |
| 4,903,858 | A | 2/1990 | Clark et al. |
| 4,958,890 | A | 9/1990 | Anderson et al. |
| 5,720,536 | A | 2/1998 | Jenkins et al. |
| 5,897,181 | A | 4/1999 | Avendano et al. |
| 5,899,546 | A | 5/1999 | Avendano et al. |
| 6,036,293 | A | 3/2000 | Anell et al. |
| 6,773,082 | B2 | 8/2004 | Lee |

FOREIGN PATENT DOCUMENTS

| | | |
|---|---|---|
| CA | 1033800 | 6/1978 |

*Primary Examiner*—John C. Hong
(74) *Attorney, Agent, or Firm*—Diederiks & Whitelaw PLC

(57) ABSTRACT

A method of assembling a refrigerator cabinet assembly including creating a shell by bending a single sheet of material to form side walls interconnected by a top wall, forming front face portions by in-turning front edge portions of the side and top walls, creating a flange assembly including at least a front flange which leads to a return flange that extends to a rear flange, and inserting first and second reinforcing members behind the rear flange so as to be arranged at spaced locations against the rear flange and one of the side walls. The reinforcing members function to increase the structural integrity of the shell while including tab structure for mounting and/or shell deformation preventing purposes.

6 Claims, 8 Drawing Sheets

METHOD OF ASSEMBLING A REFRIGERATOR CABINET

CROSS REFERENCE TO RELATED APPLICATIONS

This application represents a divisional application of U.S. patent application Ser. No. 10/617,401 filed Jul. 11, 2003, now U.S. Pat No. 7,014,283, which claims the benefit of U.S. Provisional Patent Application Ser. No. 60/396,023 filed on Jul. 16, 2002.

BACKGROUND OF THE INVENTION

1. Field of the Invention

The present invention pertains to the art of refrigerators and, more particularly, to the reinforcement of front corner portions of a refrigerator cabinet.

2. Discussion of the Prior Art

In constructing a refrigerator cabinet, it is highly desirable to minimize the weight of the cabinet shell to reduce manufacturing, transportation and additional associated costs, yet it is imperative that the cabinet be structurally sound in order to counteract loads exerted thereon without deforming. Mainly due to cost efficiencies and flexibility in workmanship, it has been commonplace to utilize sheet metal in the forming of most refrigerator cabinets on the market today. In the past, it has been known to employ heavy gauge sheet metal in forming a refrigerator cabinet, specifically by welding the overall cabinet and then subsequently painting the entire cabinet. However, these heavier gauge steel assemblies have more recently been replaced with lighter gauge steel. Since the sheet metal is thin and rather high loads are often placed on the shell, particularly by the opening and closing of a weighted down refrigerator door, a fair amount of effort has been applied in this art to provide reinforcement for such a refrigerator cabinet.

With this in mind, it has heretofore been proposed to form the sides and top of a refrigerator cabinet shell out of a single piece of thin, bent sheet metal which has been pre-painted and then to attach thereto rear and bottom walls. To preserve the surface quality of the cabinet, corner welds have been replaced by mechanical fasteners. However, these changes have resulted in a reduction in cabinet strength, particularly prior to insulation foam curing. To compensate for this reduction in structural integrity, it has been proposed to structurally reinforced the shell in an attempt to avoid deformation during use. Such known reinforcing arrangements generally take the form of providing either a unitary frame or multiple reinforcement members, in the form of bars or plates, and securing these members to the cabinet shell.

Regardless of these proposed refrigerator cabinet constructions, there still exists a need for an improved reinforcement arrangement which provides for effective localized reinforcement in critical cabinet zones. More specifically, there exists a need for a cost efficient and easily assembled refrigerator cabinet reinforcing arrangement which enables the effective use of pre-painted, thin sheet metal in creating an aesthetically pleasing and structurally sound overall refrigerator cabinet assembly.

SUMMARY OF THE INVENTION

The present invention is directed to providing localized reinforcement of a sheet metal refrigerator cabinet. More specifically, the invention is directed to specifically locating internal cabinet bracing designed to reinforce front corner portions of the refrigerator cabinet and provide rigid anchor points for door hinge structure. Most preferably, corner brackets are used in combination with vertical stanchions to provide the necessary reinforcement at each of the front corner portions to assure that the cabinet can effectively support pivotally mounted doors without deformation. The corner brackets and vertical stanchions cooperate with a transverse mullion to rigidify the frontal portion of the overall cabinet.

In accordance with the most preferred form of the invention, the front peripheral portion of the refrigerator cabinet includes a triple flange construction. Since the cabinet is formed from a single bent piece of sheet metal, the triple flange must be interrupted at lower and upper corner regions. The corner brackets and stanchions are provided at these locations to essentially re-establish the continuous construction, while simultaneously defining tapping plate structure for the attachment of door hinges. At the same time, this reinforcing structure accommodates the attachment of a transverse mullion and the insertion of refrigerator compartment liners.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENTS

Figure 1:
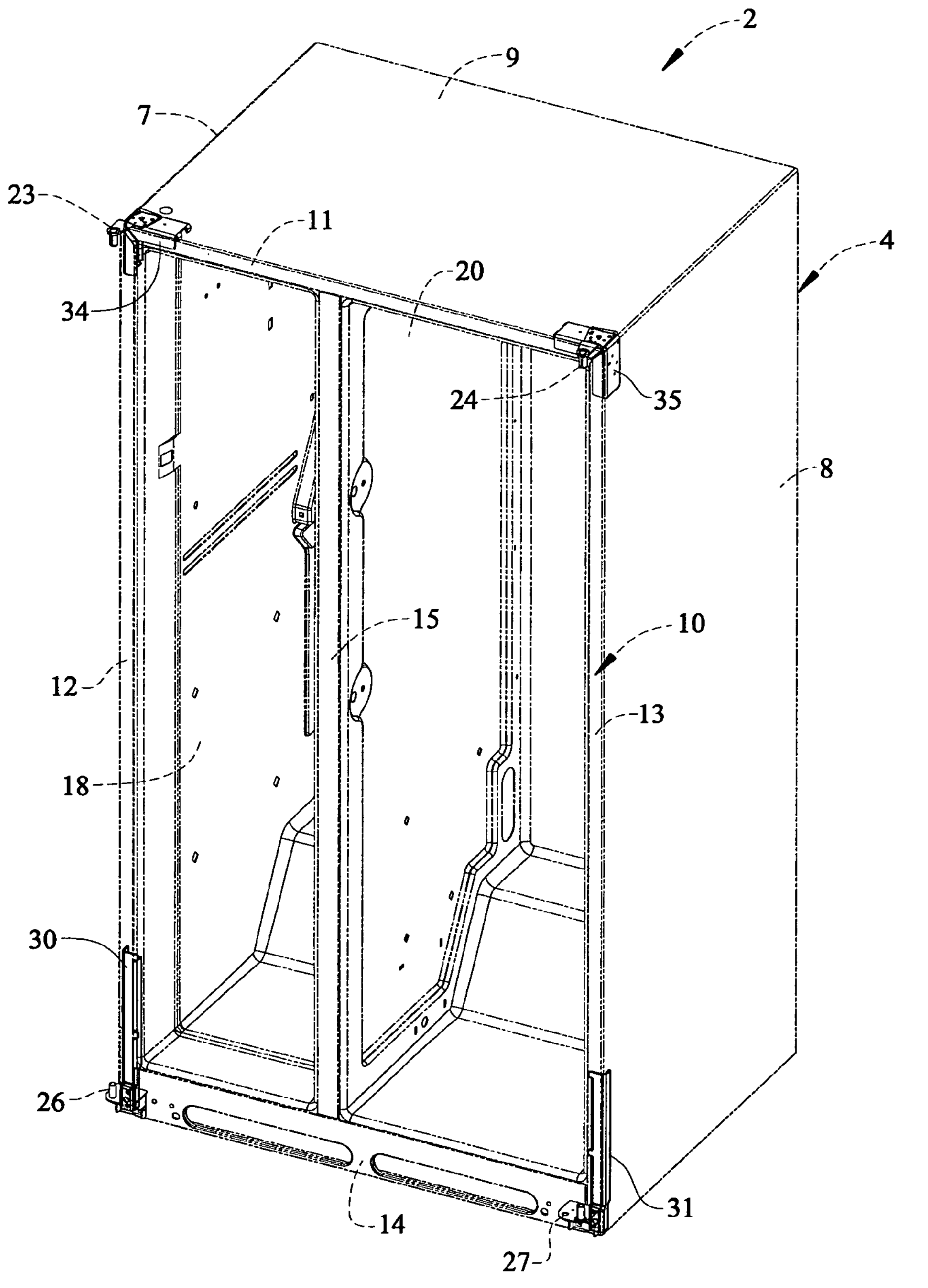
FIG. 1 is an upper right perspective view showing, in phantom, a side-by-side refrigerator incorporating the localized reinforcement system of the present invention.

With initial reference to FIG. 1, the present invention will be described in connection with a side-by-side refrigerator generally indicated in phantom at 2. Refrigerator 2 includes a cabinet shell 4 having side walls 7 and 8 and a top wall 9. In the most preferred form of the invention, walls 7–9 are formed from bending a single piece of thin gauge sheet metal which is pre-painted. The sheet metal is also bent to define a front flange 10 having a top portion 11 and side portions 12 and 13. Extending across and interconnecting a lower front portion of side walls 7 and 8 of cabinet shell 4 is a bottom mullion 14. The particular mounting of bottom mullion 14 in accordance with the invention will be described more fully below.

Given that refrigerator 2 constitutes a side-by-side style refrigerator, a vertical mullion 15 is also provided which aids in mounting a freezer liner 18 that defines a freezer compartment and a fresh food liner 20 which defines a fresh food compartment. Cabinet shell 4 also has attached thereto upper hinge brackets 23 and 24, as well as lower hinge brackets 26 and 27 for pivotally supporting freezer and fresh food doors (not shown) in a manner generally known in the art.

Obviously, in forming front flange 10 out of the same piece of sheet metal forming side walls 7 and 8 and top wall 9, it is necessary to interrupt the material at the upper front corners. Since upper hinge brackets 23 and 24 are mounted at these locations, it is considered important in accordance with the present invention to maintain the integrity of these portions of cabinet shell 4 as if no interruptions were present. That is, in forming front flange 10, it is necessary to cut or stamp the sheet metal at generally 45° angles which creates slight gaps at these upper corners. Also, the lower corners of cabinet shell 4 adjacent lower hinge brackets 26 and 27 are also considered to warrant reinforcement for structural integrity purposes. To this end, the present invention is particularly concerned with providing vertical side reinforcing stanchions 30 and 31, as well as upper reinforcing corner brackets 34 and 35, all of which are shown in FIG. 1. As will be detailed more fully below, stanchions 30 and 31 and corner brackets 34 and 35 cooperate with particular structure for front flange 10 to provide the desired reinforcement at these locations in conjunction with bottom mullion 14, as well as to accommodate the easy assembly of freezer liner 18 and fresh food liner 20 into cabinet shell 4.

Figure 2:
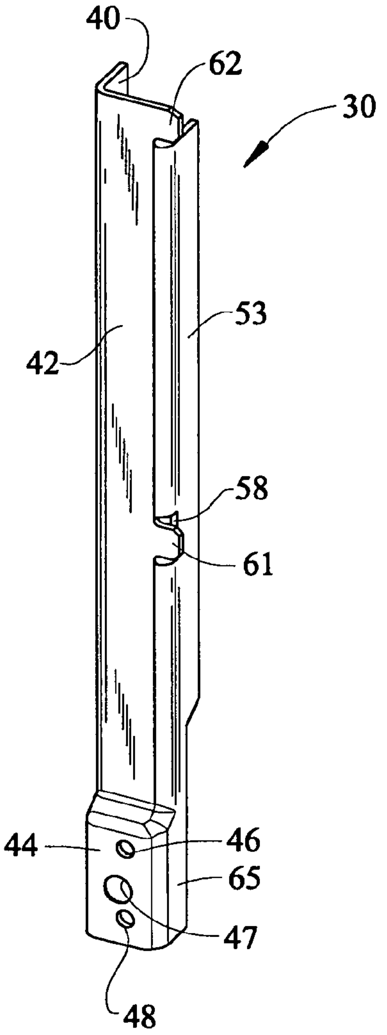
FIG. 2 is a perspective view of a left side reinforcing stanchion forming part of the localized reinforcement system.

Particular reference will now be made to FIG. 2 in describing the preferred construction of stanchions 30 and 31 in accordance with the present invention. More particularly, this figure will be referenced in describing in detail the preferred construction of stanchion 30 and it is to be understood that stanchion 31 merely represents a mirror image thereof. In the preferred embodiment illustrated, stanchion 30 includes an outer side wall 40 which extends substantially perpendicular to a front wall 42. At a lowermost portion of front wall 42, stanchion 30 is provided with a lowermost frontal plate 44. As illustrated, lowermost frontal plate 44 is actually offset from front wall 42, i.e., lowermost frontal plate 44 projects forward beyond a plane defined by front wall 42. In addition, lowermost frontal plate 44 is preferably provided with a plurality of apertures 46–48. Stanchion 30 also includes an inner side wall 53 which extends substantially perpendicular to front wall 42 and parallel to outer side wall 40. Along a generally central portion of stanchion 30, inner side wall 53 is formed with a cut-out 58. At a corresponding location, frontal wall 42 is provided with a transversely projecting tab 61. Spaced from tab 61, frontal wall 42 is preferably provided with an additional tab 62. In accordance with the most preferred embodiment of the invention, the entire stanchion 30 is formed from a single piece of metal, with outer side wall 40 and inner side wall 53 being bent from front wall 42. The portions of outer side wall 40 and inner side wall 53 at lowermost frontal plate 44 are indicated at 64 and 65 respectively (also see FIGS. 5 and 7–9).

Prior to describing the mounting of stanchions 30 and 31 to cabinet shell 4, the preferred construction for each of corner brackets 34 and 35 will now be described with particular reference to FIG. 3. As designed, each of corner brackets 34 and 35 are symmetrically configured such that a single corner bracket construction can be utilized at each location. Therefore, specific reference will be made to the construction of corner bracket 34 in FIG. 3 and it is to be understood that an identical construction for corner bracket 35 exists. As shown, corner bracket 34 includes a first or top plate portion 69 and a second or side plate portion 70. At an outermost end of top plate portion 69 are provided upper bent tabs 73 and 74 which are spaced by a gap defined at edge 76. Top plate portion 79 also has associated therewith front and rear, upper depending flanges 79 and 80 (also see FIG. 6). In a similar manner, side plate portion 70 is provided with front and rear, side depending flanges 82 and 83. In addition, side plate portion 70 is preferably provided with bent tabs 87 and 88 which are gapped along an edge 90 (see FIGS. 4 and 6) of side plate portion 70 remote from top plate portion 69.

Figure 3:
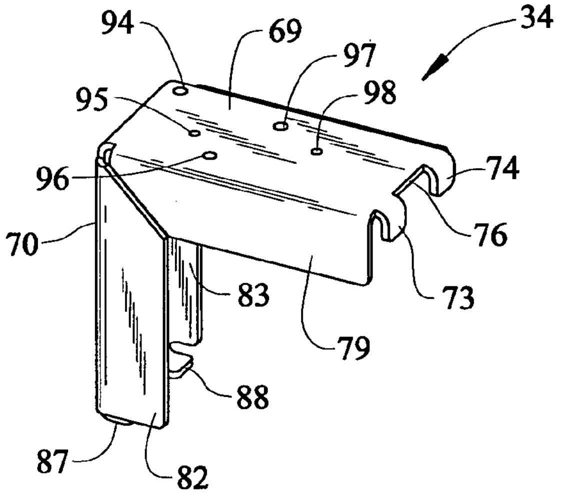
FIG. 3 is a perspective view of a reinforcing corner bracket which also forms part of the localized reinforcement system.

As illustrated in FIG. 3, top plate portion 69 is provided with a plurality of spaced holes 94–98. At this point, it should also be noted that, in accordance with the most preferred embodiment of the invention, flange 79 preferably projects downward further from top plate portion 69 than flange 80. In a similar manner, flange 82 preferably projects from side plate portion 70 a distance greater than flange 83. Further details of this preferred construction will become more fully apparent below in describing the interrelationship between corner brackets 34 and 35 and cabinet shell 4. However, at this point, it should be noted that tabs 73, 74, 87 and 88 are preferably bent from top and side plate portions 69 and 70 to assure that edges 76 and 90 are slightly rolled.

Figure 4:
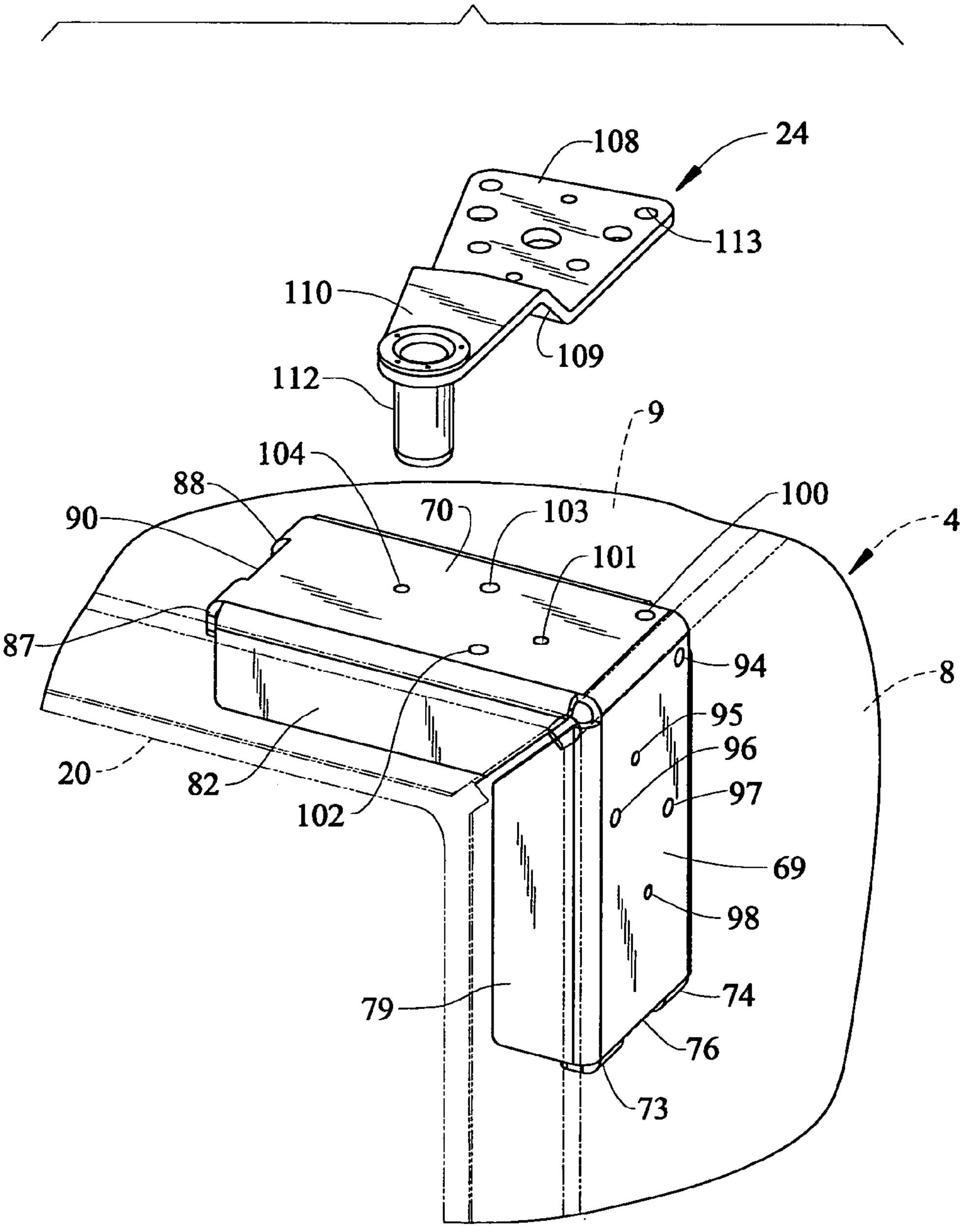
FIG. 4 is a partially exploded, perspective view of an upper right cabinet portion of the refrigerator of FIG. 1.
Figure 6:
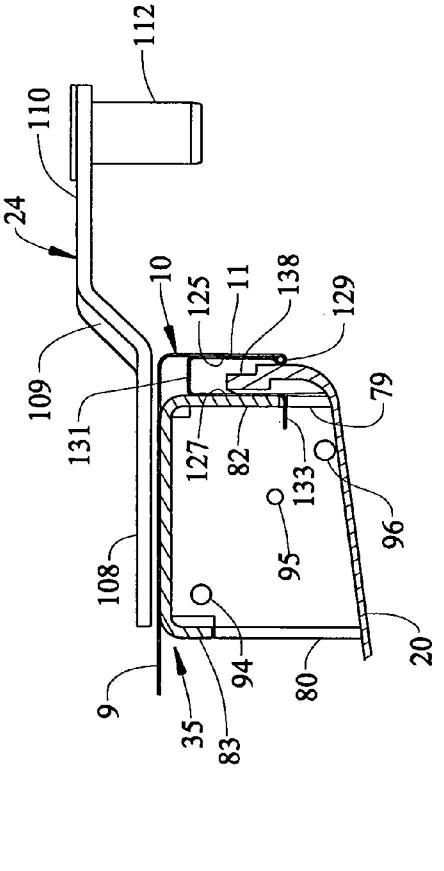
FIG. 6 is a partial cross-sectional view of an upper corner portion of the refrigerator cabinet illustrating the mounting of the reinforcing corner bracket.
Figure 9:
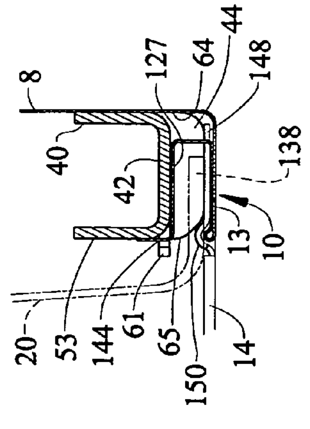
FIG. 9 illustrates a final mounting position for the stanchion of FIG. 8, along with a mullion and liner of the overall refrigerator cabinet.
Figure 8:
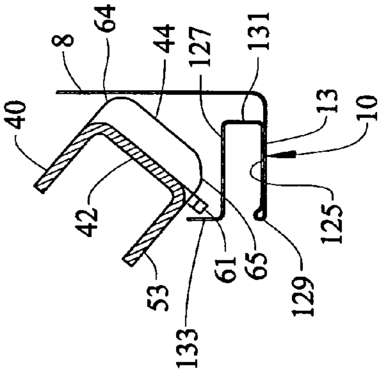
FIG. 8 is a cross-sectional view illustrating a subsequent mounting position for the reinforcing stanchion.
Figure 7:
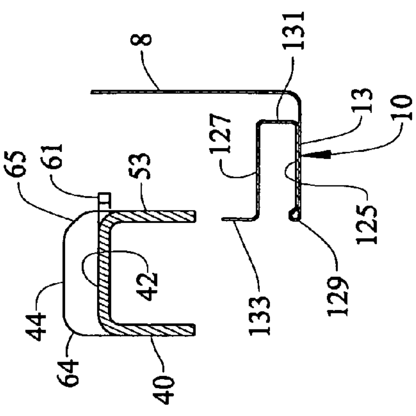
FIG. 7 is an exploded cross-sectional view illustrating an initial relative position for the mounting of the reinforcing stanchion.

Reference will now be made to FIGS. 4 and 6 in describing the preferred construction of front flange 10, along with the mounting of corner bracket 35, upper hinge bracket 24 and fresh food liner 20 in accordance with the invention. Given the differences in dimensions of flanges 79 and 82 as compared to flanges 80 and 83, it should be realized that, in repositioning the bracket discussed above with reference to FIG. 3 for use in the upper right corner of refrigerator 2 as shown in FIG. 4, the described top plate portion 69 now becomes arranged along side wall 8 of cabinet shell 4 and the previously described side plate portion 70 extends along top wall 9. Therefore, it should be readily apparent that utilizing terms such as top and side in connection with describing corner brackets 34 and 35 are merely utilized for convenience with reference to particular illustrations. Therefore, these qualifying terms should not be considered limiting in accordance with the present invention.

In any event, FIG. 4 illustrates that plate portion 70 is also provided with a set of holes 100–104 which correspond to holes 94–98 provided in plate portion 69. Holes 94–98 and/or holes 100–104 are utilized in interconnecting a respective corner bracket 34, 35 to cabinet shell 4, as well as securing a respective upper hinge bracket 23, 24. Although not considered limiting in accordance with the present invention, the preferred construction of each of upper hinge brackets 23 and 24 is illustrated in these figures to include a mounting plate portion 108 which leads to an angled portion 109 and a frontal extension 110. Frontal extension 110 is provided with a hole (not separately labeled) which accommodates a hinge pin 112. Mounting plate portion 108 is also provided with a plurality of apertures, one of which is indicated at 113. Various ones of apertures 113 are adapted to align with respective ones of holes 94–98 or 100–104 for mounting purposes as will be discussed more fully below.

FIG. 6 illustrates the preferred construction of cabinet shell 4 at front flange 10 in accordance with the present invention. In general, front flange 10 forms part of an overall triple flange construction. More specifically, cabinet shell 4 is preferably provided with front flange 10, a return flange 125 and a rear flange 127. That is, cabinet shell 4 is provided with a bend section 129 and a terminal portion of front flange 10 in order to define return flange 125. Return flange 125 extends directly along a substantial portion of front flange 10 and leads to a connection section 131 with rear flange 127. Rear flange 127 also leads to a terminal bent section 133 which is spaced from top wall 9. In general, it should be understood that cabinet shell 4 is provided with a corresponding triple flange arrangement generally about the front periphery thereof. However, gaps are necessarily provided at the front corners of cabinet shell 4. It is considered in accordance with the present invention that this triple flange arrangement provides significant structural reinforcement at the front of cabinet shell 4, but the integrity of the overall arrangement is compromised due to the interruptions in the overall triple front flange arrangement. To this end, the present invention provides reinforcing stanchions 30 and 31, as well as corner brackets 34 and 35, at these interruption locations in order to simulate, at least as far as cabinet shell 4 is concerned, that the interruptions do not exist.

As shown in these figures, corner bracket 35 is positioned behind front flange 10 and, in fact, is actually arranged behind rear flange 127. More specifically, flanges 79 and 82 extend along the rear flange 127 at side wall 8 and top wall 9 respectively. Given the distance to which flanges 79 and 82 project from plate portions 69 and 70, substantially the entire distance between terminal bent end 133 and a respective one of side wall 8 or top wall 9 is spanned by a respective flange 79, 82 as clearly shown in FIG. 6. On the other hand, flanges 80 and 83 are considerably shorter than flanges 79 and 82 as flanges 80 and 83 are spaced well behind front flange 10 and additional material is not considered necessary. In any event, each of corner brackets 34 and 35 is nested in the overall triple flange arrangement and each of corner brackets 34 and 35 is preferably attached to cabinet shell 4 in this position through the use of either pop rivets or screws (not shown) at select one of holes 94–98 and 100–104. If corner bracket 34 or 35 is used in electrical grounding path, screws are preferably employed. At the same time, corner brackets 34 and 35 define tapping plates for use in connection with securing a respective one of upper hinge brackets 23 and 24 in position, with the alignment of various ones of apertures 113 and holes 94–98 and 100–104 for receiving screws.

As there can be considerable loading upon cabinet shell 4 during the overall assembly and use of refrigerator 2, it is considered important in accordance with the present invention that edges 76 and 90 are rolled to avoid the existence of raised or sharp edges in order to prevent creases from being created at these locations in any one of side walls 7 and 8 and top wall 9. Once corner brackets 34 and 35 are mounted in this manner, it should be readily recognized that a space still exists between return flange 125 and rear flange 127 which can readily accommodate an outwardly extending flange 138 of fresh food liner 20 (FIG. 6) or, in a corresponding manner, of freezer liner 18.

With the inclusion of corner brackets 34 and 35, the structural integrity established by the triple return flange construction is maintained at the gaps or interruptions in the triple flange arrangement by the mounting of the higher gauge metal reinforcement of the corner brackets 34 and 35. At the same time, the corner brackets 34 and 35 define tapping plates for use in connection with the secure fixing of upper hinge brackets 23 and 24. Furthermore, the advantageous forming of rolled edges 76 and 90 assures that a high quality, aesthetic appearance in the outer surface of the pre-painted cabinet shell 4 will be maintained. However, provisions are also considered necessary in connection with reinforcing the lower frontal end portions of cabinet shell 4 at front flange 10, while accommodating the mounting of freezer and fresh food liners 18 and 20 and lower hinge brackets 26 and 27 through the use of bottom mullion 14 and stanchions 30 and 31 which will now be described with particular reference to FIGS. 5 and 7–9.

Figure 5:
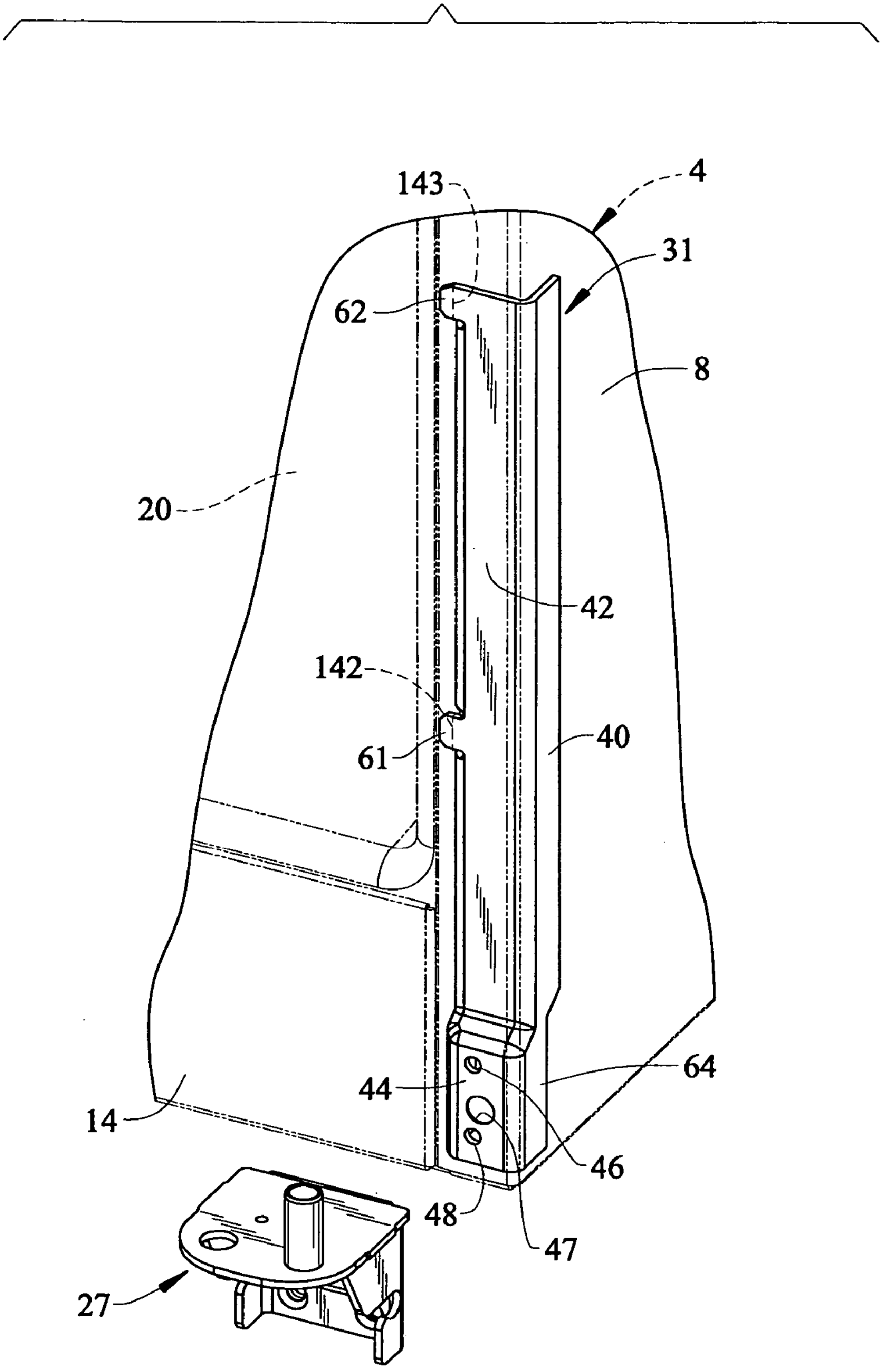
FIG. 5 is a partially exploded, perspective view of a lower right cabinet portion of the refrigerator of FIG. 1.

As clearly illustrated, the overall triple front flange construction at these portions of cabinet shell 4 are the same as that described above with respect to FIG. 6 such that like reference numerals have been utilized to refer to corresponding parts. FIG. 5 illustrates the positioning of stanchion 31 and particular reference will be made to FIGS. 7–9 in indicating the manner in which either one of stanchions 30 or 31 is mounted. As shown, stanchion 31 is rotated to a position behind rear flange 127, between terminal bent section 133 and side wall 8. Terminal bent section 133 is preferably provided with a pair of longitudinally spaced slots 143 and 144 (also see FIG. 5) into which project tabs 61 and 62 respectively. In this manner, tabs 61 and 62 function to properly locate the respective stanchion 30, 31 vertically. The distance between outer side wall 40 and inner side wall 53 is only slightly less than the distance between a respective one of side walls 7 and 8 and terminal bent section 133 such that, as clearly shown in FIG. 9, the stanchion 30, 31 spans the distance between the side walls 7, 8 and terminal bent section 133, while frontal wall 42 is abutted up against rear flange 127.

At a lowermost portion of cabinet shell 4, the triple flange arrangement is terminated such that the offset lowermost frontal plate 44 of a respective stanchion 30, 31 extends further forward towards front flange 10. Of course, this is at a position located lower than the attachment of either freezer liner 18 or fresh food liner 20. However, this is at a position wherein a terminal end 148 of bottom mullion 14 projects behind front flange 10 as clearly shown in FIG. 9. In the most preferred form of the invention, the portion of bottom mullion 14 which spans the open frontal space between the front flange 10 and each of side walls 7 and 8 extends in a substantially coplanar relationship with the front flanges 10 as clearly shown in this figure. Due to the inclusion of bend section 129, bottom mullion 14 also preferably includes an arcuate section 150 at each end which extends around a respective bend section 129 and leads to terminal end 148. With this arrangement, terminal end 148 of bottom mullion 14 is sandwiched between front flange 10 and lowermost frontal plate 44. A headless rivet attachment is preferably utilized in interconnecting terminal end 148 of bottom mullion 14 and cabinet shell 4 and, following insertion of a respective stanchion 30, 31 and the positioning of a respective lower hinge bracket 26, 27, at least two screws, which extend through apertures in the respective lower hinge bracket 26, 27, front flange 10 and terminal end 148 of bottom mullion 14, are threadably secured into apertures 46 and 48 of the respective stanchion 30, 31 for fixedly securing the lower hinge bracket 26, 27 in place and solidifying the overall attachment.

With this construction, tabs 61 and 62 effectively cooperate with terminal bent section 133 to properly locate stanchion 30, 31 and a respective lower hinge bracket 26, 27 can be simultaneously attached to cabinet shell 4 with a respective stanchion 30, 31. In this manner, stanchions 30 and 31, along with bottom mullion 14, provide the desired lower structural reinforcement for cabinet shell 4 to adequately support freezer and fresh food doors without undue flexing of cabinet shell 4 during further assembling, transporting or accessing refrigerator 2 during its life span. Therefore, this localized reinforcement system assures the structural integrity of the overall cabinet shell 4. Importantly, the various components of the reinforcement system can be easily assembled, while defining a cost efficient and extremely effective reinforcing arrangement.

Figure 10:
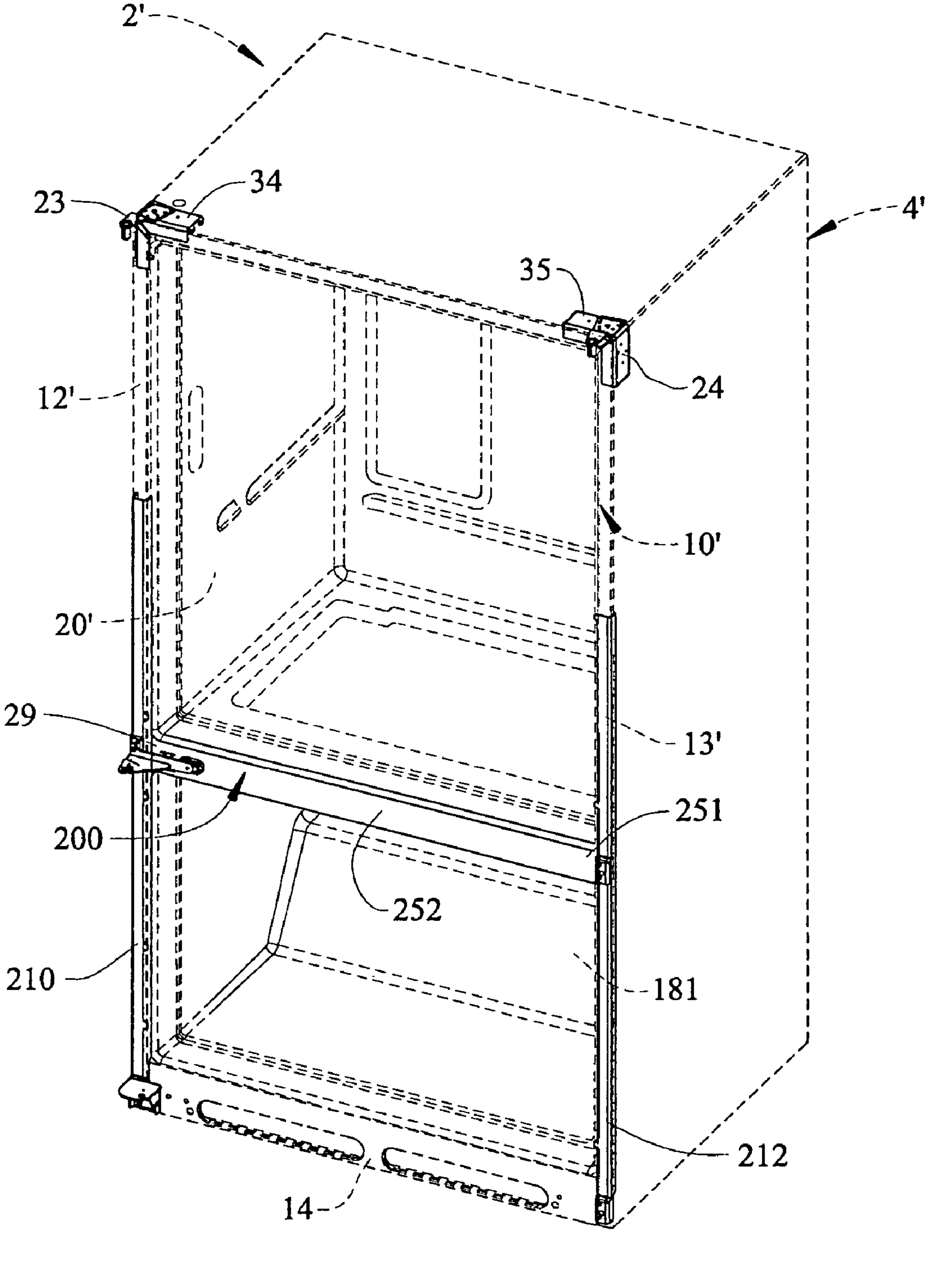
FIG. 10 is an upper right perspective view, showing in phantom, a bottom mount refrigerator incorporating the localized reinforced system constructed in accordance with a second embodiment of the present invention.

Referring to FIG. 10 which illustrates another embodiment of the present invention wherein like reference numerals indicate corresponding parts to the embodiment described above, a bottom mount refrigerator 2' includes a cabinet shell 4' within which is positioned a freezer liner 18' that defines a freezer compartment arranged in a lower portion of cabinet shell 4', while a fresh food liner 20' defines a fresh food compartment arranged above the freezer compartment. Separating freezer liner 18' and fresh food liner 20' is a horizontal mullion bar 200. In a manner known in the art, a freezer door (not shown) is either pivotally mounted or slidably supported to selectively seal or access the freezer compartment. To support a freezer door and/or a fresh food compartment door in accordance with the invention, additional, localized reinforcement is provided at either or both side portions 12'and 13' of front flange 10'. More specifically, stanchions 210 and 212 are arranged behind respective side portions 12' and 13'. As front flange 10' and side portions 12' and 13' are formed in a manner directly corresponding to front flange 10 and side portions 12 and 13 of the first described embodiment, these details will not be reiterated here.

Figure 11:
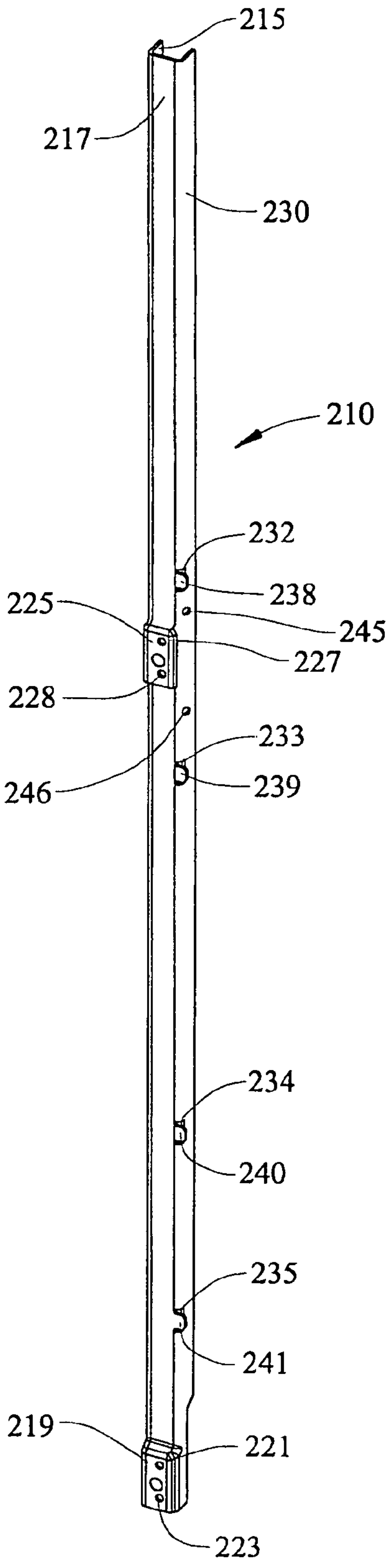
FIG. 11 is a perspective view of a left side reinforcing stanchion forming part of the localized reinforcement system constructed in accordance with the second embodiment of the present invention.

Particular reference will now be made to FIG. 11 in describing the preferred construction of stanchions 210 and 212 in accordance with this preferred embodiment of the present invention. More particularly, this figure will be referenced in describing in detail the preferred construction of stanchion 210 and it is to be understood that stanchion 212 merely represents a mirror image thereof. In the embodiment illustrated, stanchion 210 includes an outer side wall 215 which extends substantially perpendicular to a front wall 217. At a lowermost portion of front wall 217, stanchion 210 is provided with a lowermost frontal plate 219. As illustrated, lowermost frontal plate 219 is actually offset from front wall 217, i.e., lowermost frontal plate 219 projects forward beyond a plane defined by front wall 217. In addition, lowermost frontal plate 219 is preferably provided with a plurality of apertures 221 and 223. In accordance with this form of the present invention, stanchion 210 further includes an intermediate frontal plate 225 provided at an intermediate portion of front wall 217. In a manner similar to that described for lowermost frontal plate 219, intermediate frontal plate 225 is offset from front wall 217 and includes a plurality of apertures 227 and 228.

Extended stanchion 210 also includes an inner side wall portion 230 which extends substantially perpendicular to front wall 217 and parallel to outer side wall 215. Inner side wall portion 230 is provided with a plurality of cut-outs 232–235, each of which includes a corresponding transversely projecting tab 238–241. Stanchion 210 is also provided with a pair of spaced apertures 245 and 246 which, as will be detailed more fully below, provide attachment points for horizontally extending mullion 200. In accordance with this preferred form of the invention, the entire extended stanchion 210 is formed from a single piece of metal, with outer side wall 215 and inner side wall 230 being bent relative to front wall 217.

Figure 12:
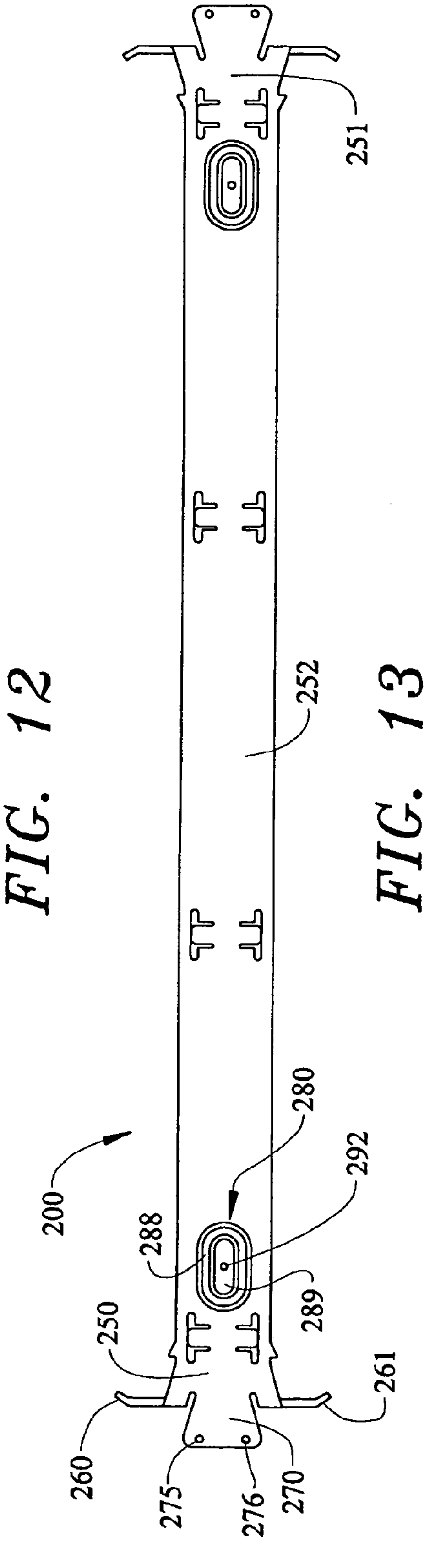
FIG. 12 is a perspective view of a mullion bar forming part of the localized reinforcement system constructed in accordance with the second embodiment of the present invention.

In accordance with the present embodiment, horizontal mullion 200 extends between side portions 12' and 13' and interconnects with intermediate frontal plate 225 of stanchions 210 and 212 (FIG. 10). As shown best in FIG. 12, horizontal mullion 200 includes a first end 250 and a second end 251 which are interconnected by a transverse web portion 252. Particular reference will now be made to FIGS. 12 and 13 in describing the preferred construction of horizontal mullion 200 in accordance with the present invention. More particularly, these figures will be referenced in describing in detail the preferred construction of first end 250 and it is to be understood that second end 252 merely represents a mirror image thereof.

Figure 13:
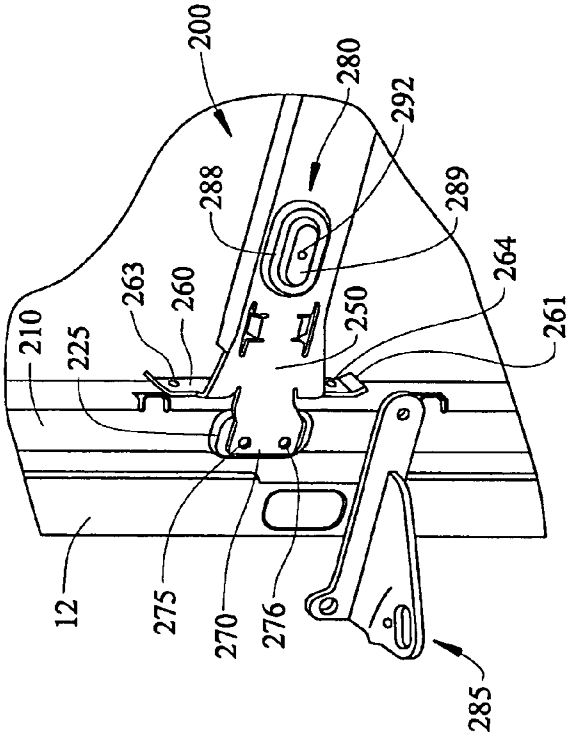
FIG. 13 is an exploded view of the mullion bar of FIG. 12 and left side stanchion of FIG. 11 incorporated into the refrigerator of FIG. 10.

In the embodiment illustrated, first end 250 of horizontal mullion bar 200 includes first and second attachment flanges 260 and 261, each having respective apertures 263 and 264. As shown, first and second attachment flanges 260 and 261 project perpendicularly from first end 250 so that apertures 263 and 264 align with spaced apertures 245 and 246 of stanchion 210. Actually first end 250 of mullion 200 is provided with a third attachment flange 270 that extends, substantially in the same plane, from transverse web portion 252. Third attachment flange 270 includes a pair of apertures 275 and 276 which align with apertures 227 and 228 of intermediate frontal plate 225. With this arrangement, horizontal mullion 200 is secured to side portion 12 through stanchion 210 (FIG. 13).

Horizontal mullion 200 is also provided with a mullion frontal plate 280 which, in combination with intermediate frontal plate 225, provides support for a central hinge 285. In the most preferred embodiment, mullion frontal plate 280 projects from transverse web portion 252 and includes a first raised portion 288 and a second raised portion 289 having a central mounting aperture 293 for receiving a hinge mounting fastener. As stanchions 210 and 212 are mounted to cabinet 4' in a manner directly corresponding to stanchions 30 and 31 of the first described embodiment, these details will not be reiterated here. Regardless, it should be clear that, with this overall arrangement, stanchions 210 and 212 provide the desired, additional structural reinforcement for cabinet shell 4'.

Although described with reference to preferred embodiments of the invention, it should be readily understood that various changes and/or modifications can be made to the invention without departing from the spirit thereof. For instance, although the invention has been disclosed with reference to side-by-side and bottom mount style refrigerators, the localized reinforcing system of the invention can also be applied to a top mount style refrigerator. In this type of refrigerator, it is preferable to extend the height of the stanchions like that of the bottom mount refrigerator described above, while the stanchions only preferably extend about 12 inches (approximately 30 cm) in the side-by-side arrangement shown and described with respect to the first embodiment. Extending the stanchions in this manner provides reinforcement for central hinge brackets employed in mounting the upper and lower compartment doors. In general, the invention is only intended to be limited by the scope of the following claims.

We claim:

1. A method of assembling a refrigerator cabinet comprising:

creating a shell by bending a single sheet of material to form side walls interconnected by a top wall;

forming the shell with front face portions by in-turning front edge portions of the side and top walls;

creating a flange assembly, which opens laterally inward of the shell, behind the front face portions, said flange assembly including at least a front flange leading to a return flange that extends to a rear flange;

inserting a plurality of reinforcing members, including first and second reinforcing members, behind said rear flange such that each of said first and second reinforcing members is arranged, at spaced locations, against said rear flange and one of the side walls; and securing the plurality of reinforcing members within the shell.

2. The method of claim 1, wherein inserting the plurality of reinforcing members includes positioning a pair of corner brackets at a respective interconnection of the top wall with a respective one of the side walls, and behind the return flange.

3. The method of claim 1, further comprising:

forming the shell from pre-painted sheet metal; and providing each of the corner brackets with bent tabs arranged against the top and side walls to prevent deformation of the top and side walls when the shell is injected with foam insulation.

4. The method of claim 1, wherein inserting the plurality of reinforcing members includes positioning a pair of stanchion members behind the return flange at lower front edge portions of the shell.

5. The method of claim 4, further comprising: locating each said stanchion member behind the return flange by positioning tab elements carried by the stanchion member through corresponding slotted openings extending through the flange assembly.

6. The method of claim 5, further comprising: attaching hinge members to each of the corner brackets and stanchion members.

* * * * *